June 13, 1950 — R. R. DUPLER — 2,511,770
GLOBE MOUNTING
Filed Oct. 13, 1945 — 2 Sheets-Sheet 1
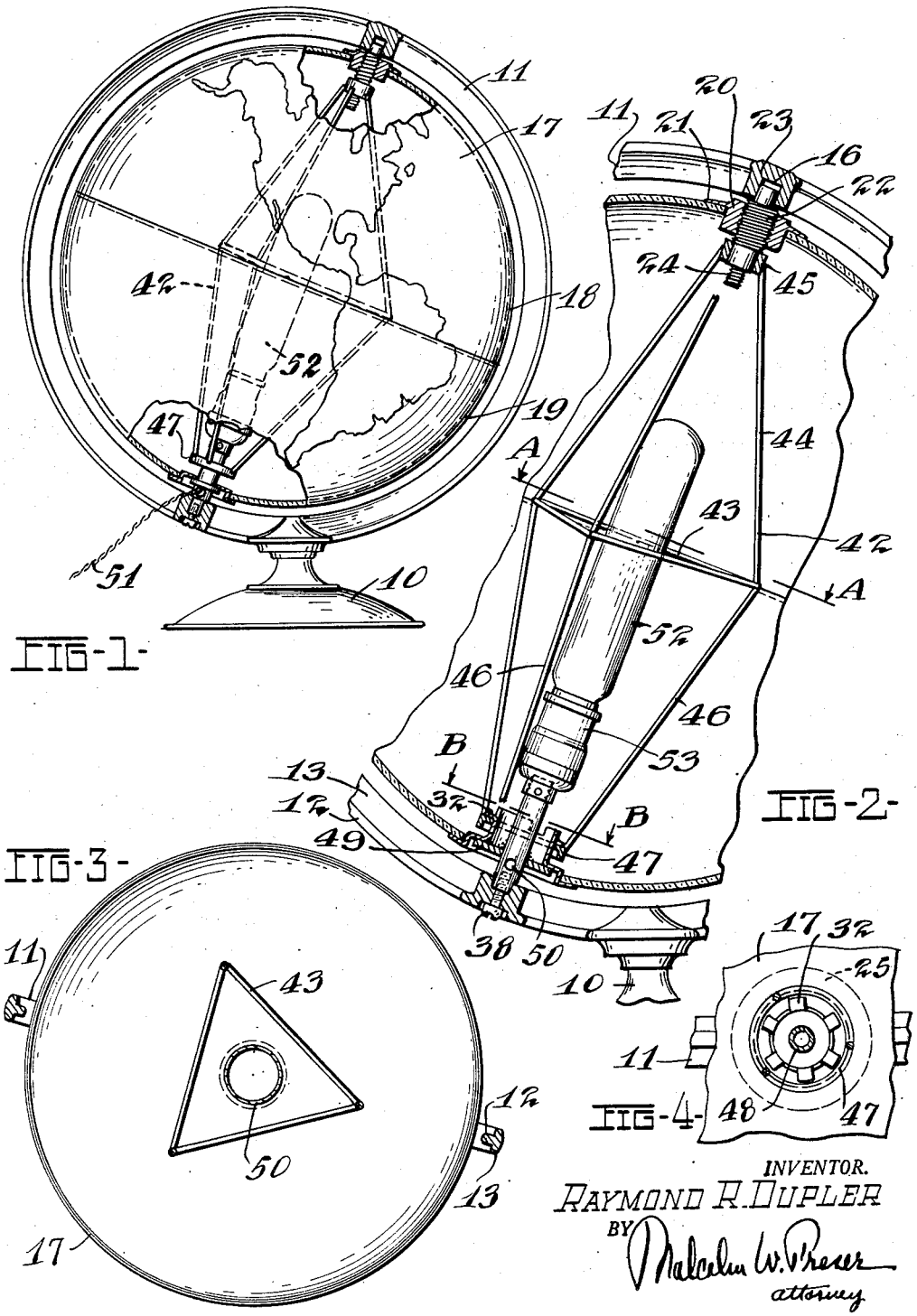
INVENTOR.
RAYMOND R. DUPLER
BY Malcolm W. Preser
attorney June 13, 1950 R. R. DUPLER 2,511,770
GLOBE MOUNTING
Filed Oct. 13, 1945 2 Sheets-Sheet 2
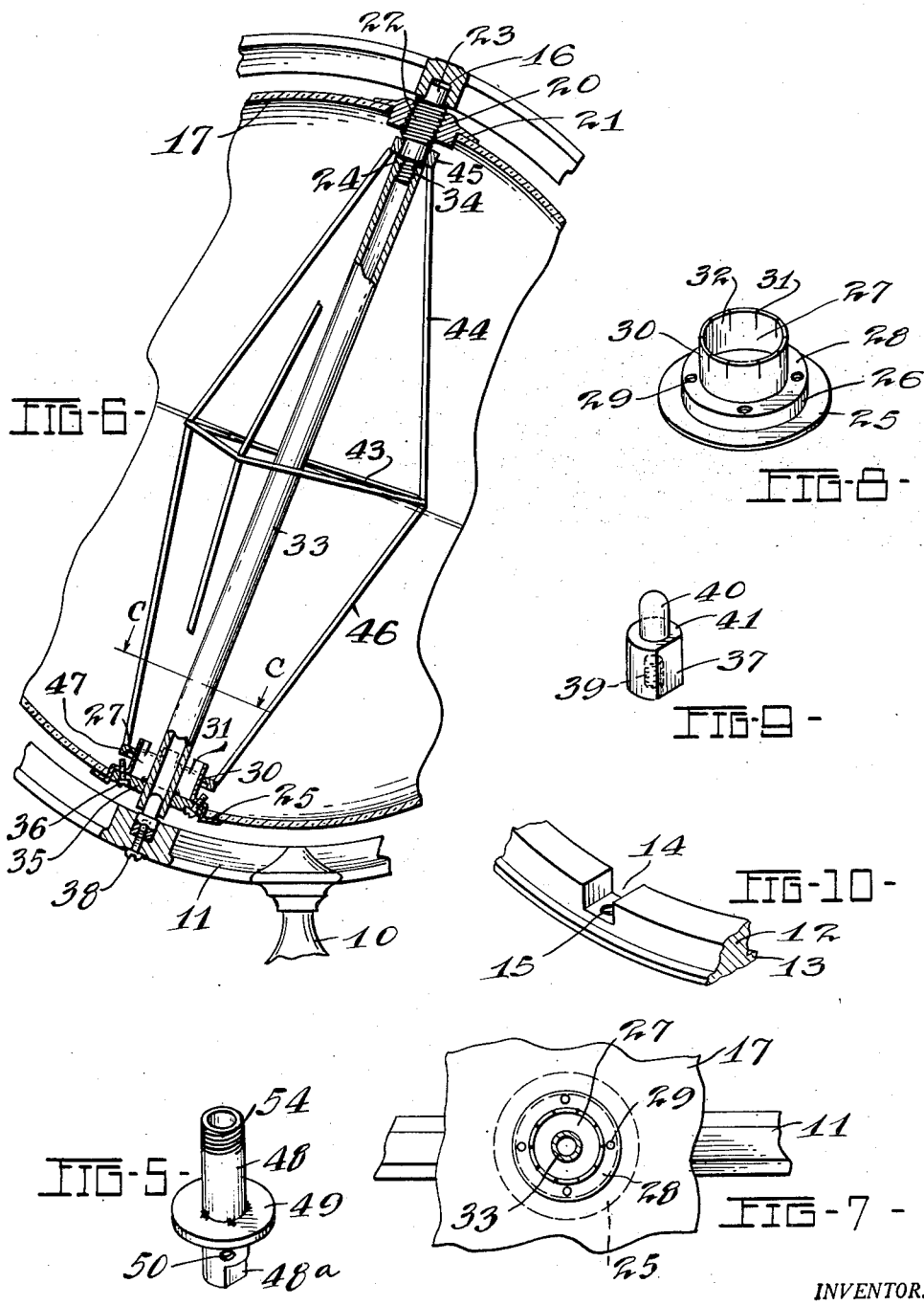
INVENTOR.
RAYMOND R. DUPLER
BY Malcolm W. Fraser
attorney Patented June 13, 1950

2,511,770

UNITED STATES PATENT OFFICE 2,511,770

GLOBE MOUNTING

Raymond R. Dupler, Toledo, Ohio

Application October 13, 1945, Serial No. 622,144

3 Claims. (Cl. 35—46)

This invention relates to globes and more particularly to globe structures composed of two hemispheres in which illumination may or may not be incorporated.

Illuminated globes are generally comprised of two spherical sections of glass, plastics, or other translucent materials on which the usual terrestrial contours are mounted. Perfect mountings are difficult to attain even though considerable care is exercised, and illumination tends to accent all such errors. Frequently the defects are such that the completed assembly is unfit for illuminated display, and considerable economies could be derived if the defective units could be converted into an acceptable non-illuminated globe.

An object of this invention is to provide a sectional globe which may be interchangeably assembled with or without illumination.

Another object of this invention is to provide a terrestrial globe in which the interchange between illumination and non-illumination is simply and expeditiously effected by suitable adapters and without any modification of the mounted hemispheres.

Another object of this invention is to provide a terrestrial globe in which illumination may be simply and expeditiously installed by one not necessarily skilled in the art.

Other objects and advantages will hereinafter appear, and for purposes of illumination but not of limitation, embodiments of the invention are shown in the accompanying drawings in which:

Figure 1 is a side elevation, parts being broken away to show the globe assembled for use with illumination;

Figure 2 is an enlarged detailed fragmentary vertical sectional view of Figure 1 showing the illuminated modification;

Figure 3 is a cross sectional view substantially along the line A—A of Figure 2;

Figure 4 is a cross sectional view substantially along the line B—B of Figure 2 showing the lower bearing assembly in detail;

Figure 5 is a detailed view of the bearing block to be used in the illuminated assembly;

Figure 6 is an enlarged fragmentary sectional view showing the assembly for use without illumination;

Figure 7 is a cross sectional view substantially along the line C—C of Figure 6 showing the lower axis of the assembly;

Figure 8 is an enlarged perspective view of the lower sleeve;

Figure 9 is a perspective view of the bearing pin for the non-illuminated assembly; and Figure 10 is a perspective view of a fragment of the meridian ring showing the slotted boss.

The illustrated embodiment of the invention comprises a base 10 supporting a meridian ring 11 composed of an annular boss 12 integrally connected to a rim section 13. A slot 14 and opening 15 in the meridian ring 11 retains a bearing pin, Figure 9, or a bearing block, Figure 5. Diametrically opposite of the opening 15 is another opening 16, which is the bearing surface for the north pole axis.

A globe 17 comprises two translucent hemispheres 18 and 19 composed of glass, plastics, or other translucent materials upon which, for example, map gores may be attached. The hemispheres are connected for resistance to relative movement by suitable means. A bushing 20 with a skirt 21 is received in an aperture at the north pole of the globe section 18, the skirt 21 overlapping the globe section for adhesive connection thereto. The threaded inner surface of the bushing 20 engages the threaded portion of the upper bearing pin 22 comprising an extending finger 23 which rides in the opening 16 in the meridian ring 11, and a threaded portion 24 disposed within the globe section 18. It is obvious that the upper bearing pin 22 may be moved toward or away from the meridian ring for engagement or disengagement therewith.

Similarly, another sleeve shown in Figure 8 is received in an aperture at the south pole of the globe section 19. A sleeve skirt 25 overlaps the globe section for adhesion thereto, and extends from a short cylindrical section 26 which continues upwardly as a cylinder 27 of smaller diameter, forming a shoulder 28 containing several screw holes 29. The upper cylinder wall 30 is slotted at 31 to form tabs 32 which may be bent down.

The hemispheres 18 and 19 are held together in assembled relation by a cage spreader 42 comprising a triangular rim 43 and rod-like elements 44 extending upwardly from the triangle corners and attaching to the upper bearing pin 22 by means of a sleeve 45 engaged to the threaded end section 24. Similar rod-like elements 46 extend downwardly and fasten upon a ring 47 encircling the cylindrical sleeve section 27, bent tabs 32 preventing the upward movement of the ring 47.

The above description constitutes the globe unit irrespective of its further use with or without illumination. In the latter modification, an adapter is used comprising a tubular element 33 tapped at its upper end 34 for engagement with the threaded end section 24 of the upper bearing pin 22. A disc 35 attached to the near lower end of the tubular element 33 seats in the cylinder 26 of the lower sleeve and is secured to the shoulder 28 by set screws 36. The adapter thus aids in holding the globe sections 18 and 19 in assembled relation and rotates upon a bearing pin, shown in Figure 9, comprising a flat faced cylindrical section 37, which seats within the slotted boss 14 of the meridian ring 11 and is secured thereto by a bolt 38 engaging a tap 39. The upwardly extending finger 40 forms the bearing upon which the tubular element 33 rotates.

When it is desired to mount the globe with illumination, the adapter and the bearing pin are removed in the obvious manner while the globe is separated from the meridian ring 11. While the globe is in this position, the means enabling use thereof with illumination are positioned without the separation of the semi-spherical sections forming the globe. The cage spreader thus operates to hold the semi-spherical sections together at all times whether mounted with or without illumination and when separated from the supporting meridian ring to enable such modifications.

The attachable illuminating means consists of a bearing block shown in Figure 5 comprised of a tubular element 48 and an attached flange 49 which rides in the cylindrical lower sleeve section 26 affording a bearing surface upon which the globe 17 may rotate. The lower end section 48 of the tubular element is flattened at 48a for engagement with the slot 14 of the meridian ring 11 to which it is secured by the bolt 38. An aperture 50 enables the insertion of electrical wires 51 which pass upwardly through the tube and connected with the light bulb 52. The bulb 52 is mounted in a socket 53 which in turn is connected to a threaded end section 54 of the bearing block.

It is apparent that I have devised a globe structure which may be simply and expeditiously constructed to operate with or without illumination. It is possible to assemble the globe for illumination and thereafter, if some imperfections are found in the mounting, the adapter of Figure 5 with the attached globe may be removed and the tubular element 33 inserted for operation on its suitable bearing pin shown in Figure 9. The conversion can be thus made without delay, great skill, or disassembly of the mounted hemispheres, thus eliminating the necessity of discarding the imperfect globe and thereby reducing their relative costs.

It is to be understood that numerous changes in details of construction, arrangement and operation may be effected without departing from the spirit of the invention, especially as defined in the appended claims.

What I claim is:

1. A globe mounting comprising an external support, a pair of semi-spherical globe sections in abutting relation each having an aperture diametrically opposed to each other when the sections are assembled, an internally screw-threaded bushing in one aperture and adhesively connected to the respective globe section, a pin having a head socketed for turning movements in said support and a screw-threaded shank engaging said bushing, a reduced screw-threaded end portion on said shank extending inside of the respective globe section, a bushing in the aperture of the other globe section having a flange adhesively connected to such section, a reduced tubular extension on said bushing projecting inside of the respective globe section and providing a shouldered portion with the adjacent bushing wall, a disc abutting said shouldered portion, means providing a connection between said disc and the adjacent portion of said external support, a ring fitting said tubular flange, means to hold said ring on said tubular flange, a ring threadedly engaging said reduced screw-threaded end portion, and a wire cage having its ends fixed respectively to said rings thereby to retain said globe sections in assembled relation.

2. A globe mounting as claimed in claim 1, in which the cage comprises spaced wires extending divergently from each of the rings and transverse wires connecting said divergent wires at their inner end portions.

3. A globe mounting as claimed in claim 1, in which said first ring slidably engages the outside of said tubular flange, and downturned integral tabs on the outer end of said flange for retaining said slidable ring on the flange.

RAYMOND R. DUPLER.

REFERENCES CITED

The following references are of record in the file of this patent:

UNITED STATES PATENTS

| Number | Name | Date |
|---|---|---|
| 1,808,354 | King | June 2, 1931 |
| 2,200,821 | Colberg | May 14, 1940 |
| 2,301,526 | Dupler | Nov. 10, 1942 |
| 2,307,362 | Dupler | Jan. 5, 1943 |
| 2,345,800 | Dupler | Apr. 10, 1944 |
| 2,355,304 | Koch | Aug. 8, 1944 |
| 2,368,347 | Colberg | Jan. 30, 1945 |
| 2,379,468 | Arnold | July 3, 1945 |